US012668353B2

(12) United States Patent
Joudon

(10) Patent No.: US 12,668,353 B2
(45) Date of Patent: Jun. 30, 2026

(54) VARIABLE-PITCH VANE MADE OF COMPOSITE MATERIAL FOR AN UNDUCTED FAN OF AN AIRCRAFT

(71) Applicant: SAFRAN AIRCRAFT ENGINES, Paris (FR)

(72) Inventor: Vincent Joudon, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 19/156,307

(22) PCT Filed: Feb. 10, 2024

(86) PCT No.: PCT/FR2024/050184
§ 371 (c)(1),
(2) Date: Aug. 13, 2025

(87) PCT Pub. No.: WO2024/170847
PCT Pub. Date: Aug. 22, 2024

(65) Prior Publication Data
US 2026/0116529 A1     Apr. 30, 2026

(30) Foreign Application Priority Data

Feb. 14, 2023     (FR) ................................. FR2301346

(51) Int. Cl.
*B64C 11/26*          (2006.01)
*B32B 5/02*           (2006.01)
(Continued)

(52) U.S. Cl.
CPC .............. *B64C 11/26* (2013.01); *B32B 5/024* (2013.01); *B32B 15/14* (2013.01); *B32B 27/38* (2013.01);
(Continued)

(58) Field of Classification Search
CPC ......... B64C 11/24; B64C 11/26; B64C 11/30; B32B 5/024; B32B 15/14; B32B 27/38;
(Continued)

(56) References Cited

U.S. PATENT DOCUMENTS

| 2006/0275132 A1 | 12/2006 | McMillan | |
|---|---|---|---|
| 2016/0159460 A1* | 6/2016 | Laurenceau | ....... B29D 99/0025 |
| | | | 264/103 |
| 2023/0339600 A1* | 10/2023 | Cottet | ................... F04D 29/644 |

FOREIGN PATENT DOCUMENTS

| FR | 3 080 322 A1 | 10/2019 |
|---|---|---|
| FR | 3 091 723 A1 | 7/2020 |

(Continued)

OTHER PUBLICATIONS

WO_2022018354_A1_Machine Translation (Cottet, C.) Jan. 27, 2022. [retrieved on Feb. 19, 2025] Retrieved from: Espacenet (Year: 2022).*

(Continued)

*Primary Examiner* — Elton K Wong
(74) *Attorney, Agent, or Firm* — CUSHMAN PARTNERS, LLC

(57) ABSTRACT

A variable-pitch vane made of a composite material for an unducted fan of an aircraft, the vane including a fibrous reinforcement formed as a single piece of three-dimensional fabric obtained by three-dimensional weaving including an airfoil portion and a root portion forming a retaining bulb and intended to be connected to a variable-pitch mechanism, the three-dimensional weaving being carried out continuously between the root portion and the airfoil portion, the fibrous reinforcement defining an internal shaping cavity formed by a separation extending inside the root portion and the blade portion, wherein a matrix densifies the fibrous reinforcement and reinforcing metal shells are arranged around the root portion.

10 Claims, 4 Drawing Sheets

(51) Int. Cl.
    *B32B 15/14*           (2006.01)
    *B32B 27/38*           (2006.01)

(52) U.S. Cl.
    CPC ... *B32B 2260/021* (2013.01); *B32B 2260/046*
              (2013.01); *B32B 2603/00* (2013.01)

(58) Field of Classification Search
    CPC ........ B32B 2260/021; B32B 2260/046; B32B
                                      2603/00
    See application file for complete search history.

(56)                     References Cited

FOREIGN PATENT DOCUMENTS

| | | | | |
|---|---|---|---|---|
| FR | 3 112 819 | A1 | 1/2022 | |
| FR | 3 120 249 | A1 | 9/2022 | |
| WO | WO-2022018354 | A1 * | 1/2022 | ............. B64C 11/06 |

OTHER PUBLICATIONS

International Search Report as issued in International Patent Application No. PCT/FR2024/050184, dated May 14, 2024.
Written Opinion of the International Searching Authority as issued in International Patent Application No. PCT/FR2024/050184, dated May 14, 2024.

* cited by examiner

[Fig. 1]
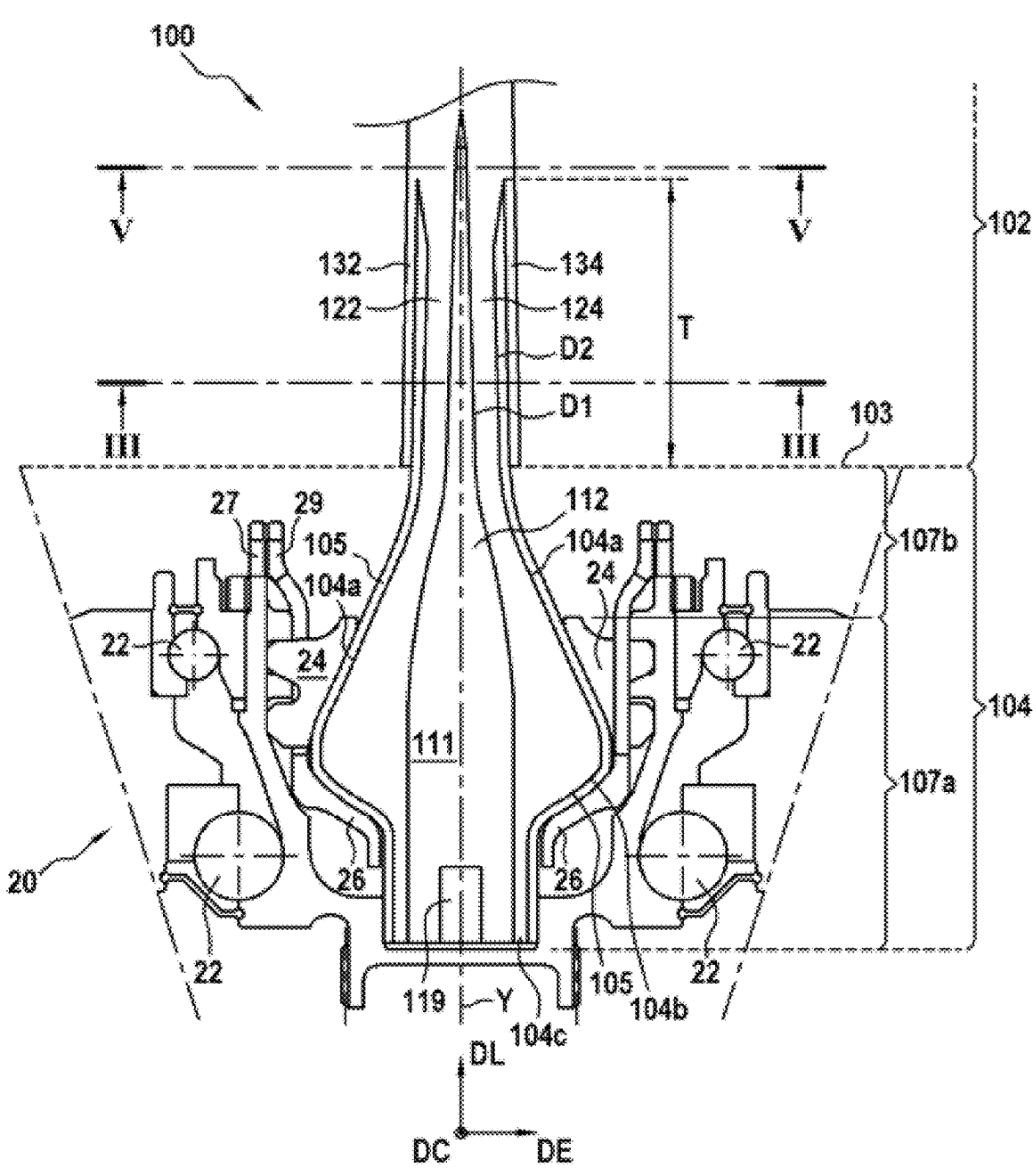

[Fig. 2]
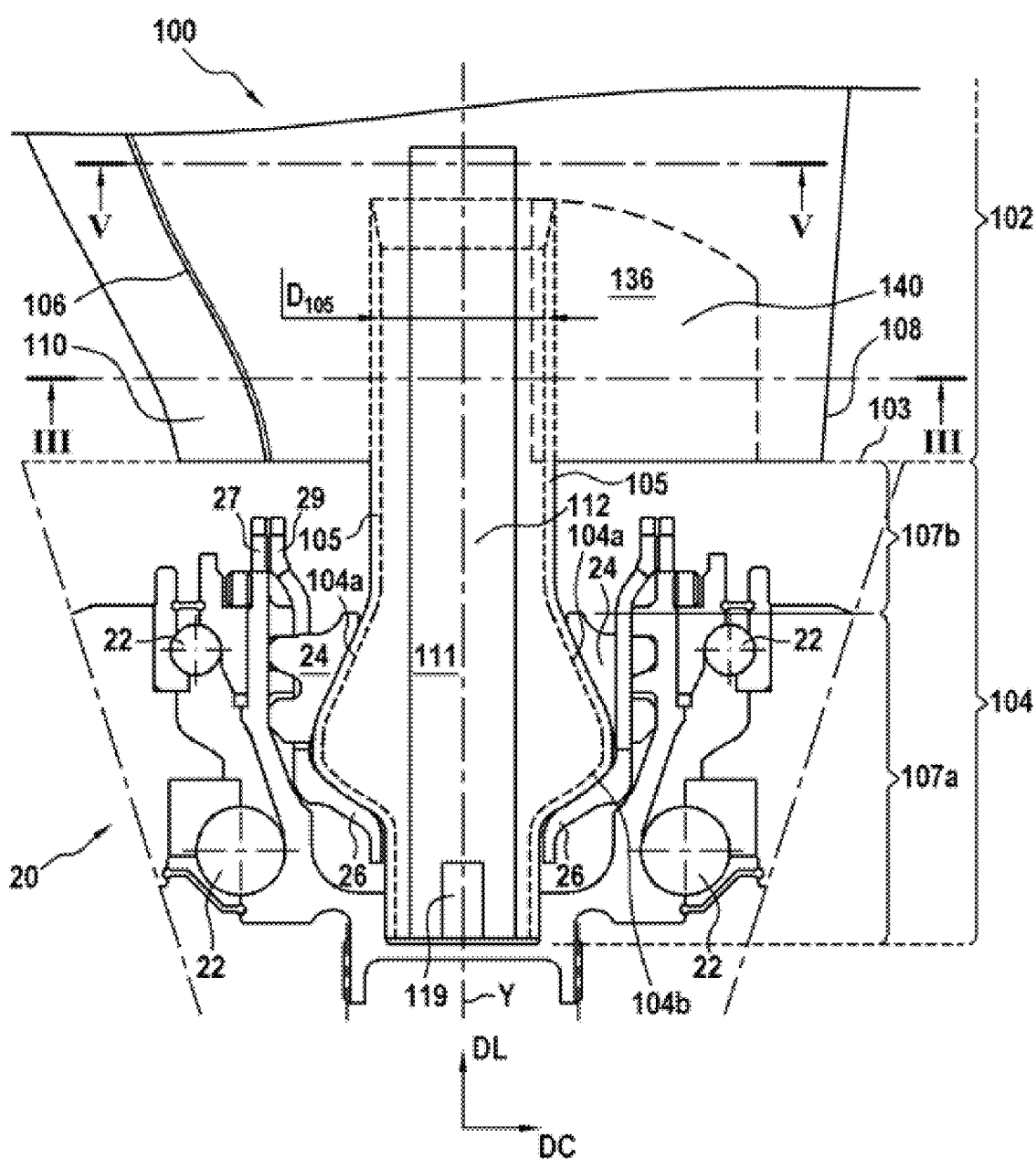

[Fig. 3]
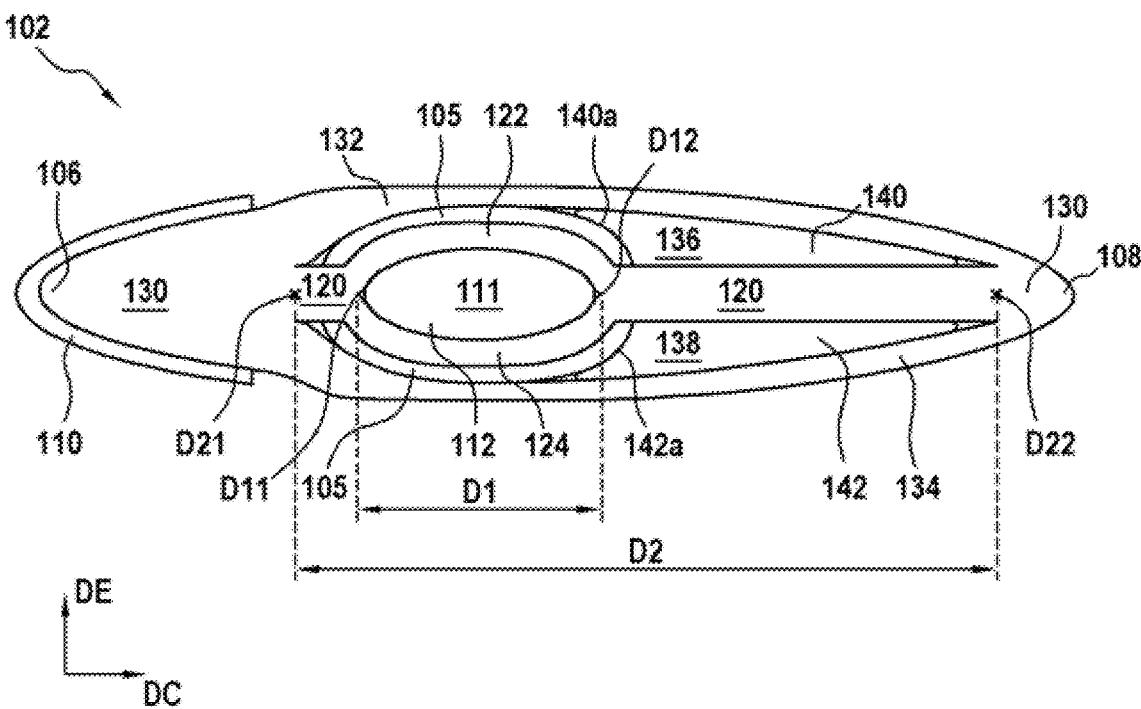
[Fig. 4]
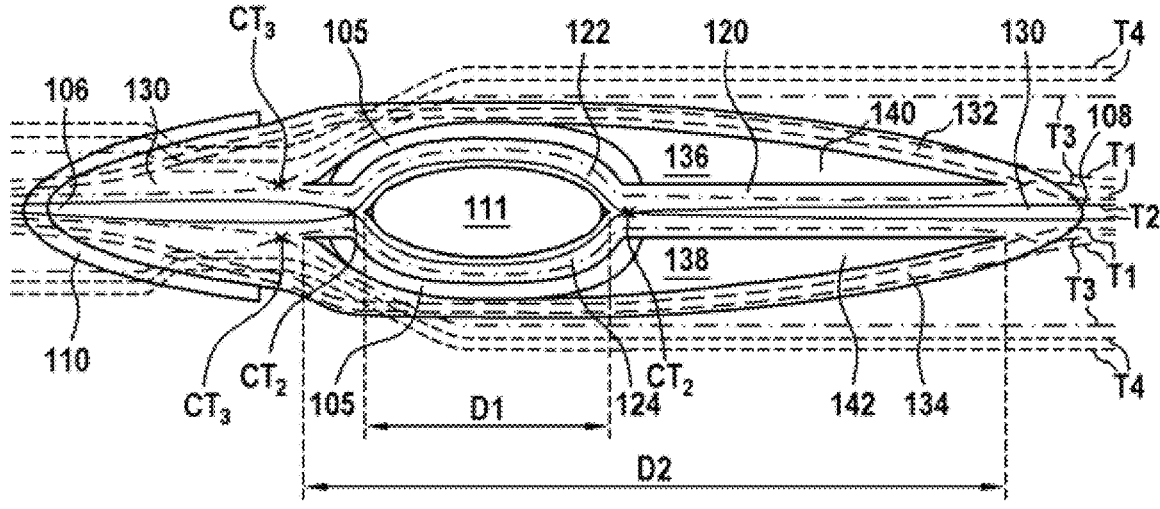

[Fig. 5]
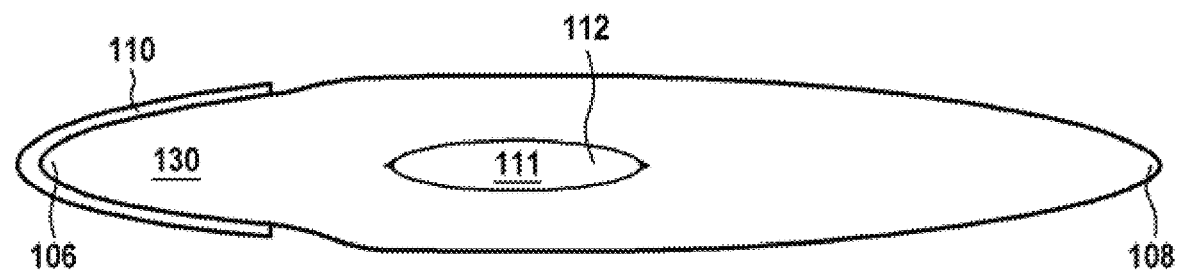
[Fig. 6]
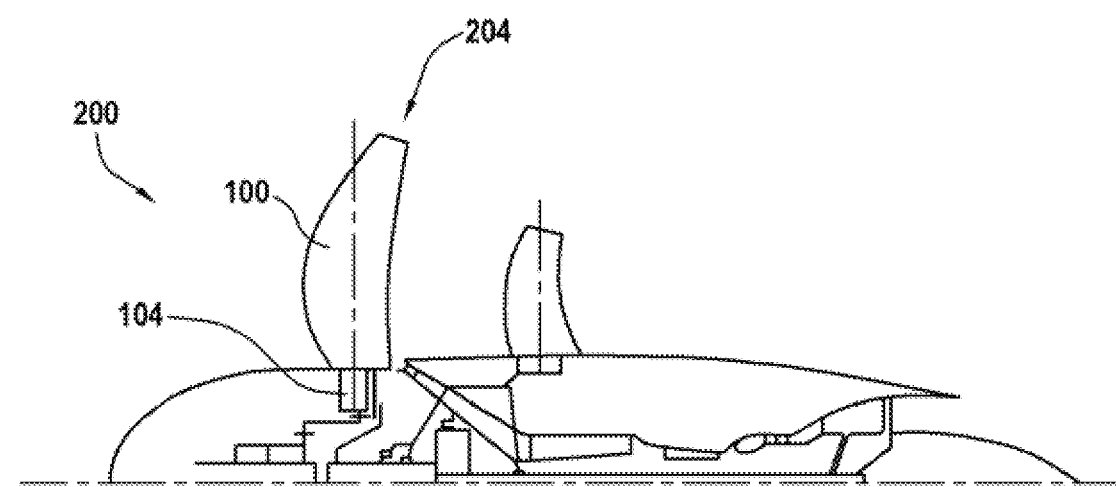

VARIABLE-PITCH VANE MADE OF COMPOSITE MATERIAL FOR AN UNDUCTED FAN OF AN AIRCRAFT

CROSS-REFERENCE TO RELATED APPLICATIONS

This application is the U.S. National Stage of PCT/FR2024/050184, filed Feb. 10, 2024, which in turn claims priority to French patent application number 2301346 filed Feb. 14, 2023. The content of these applications are incorporated herein by reference in their entirety.

TECHNICAL FIELD

The invention relates to a vane of a variable-pitch unducted fan for an aircraft, as well as to an associated fan.

PRIOR ART

The advantage of engines with unducted fans is that the diameter of the fan is not limited by the presence of a duct, so that it is possible to design an engine having a high bypass ratio, and consequently a reduced fuel consumption.

Thus, in this type of engine, the vanes of the fan can have a large span.

Moreover, these engines generally comprise a mechanism allowing modifying the pitch angle of the vanes in order to adjust the thrust generated by the fan depending on the different phases of flight.

Intense vibrational excitation can occur at high rotation speeds on unducted architectures due to the effects of installing the engine on the aircraft and the flow direction at infinity upstream. In fact, an unducted engine undergoes the influence of the ground and of the fuselage which causes a distortion in the feeding of the vane, at flow speed, depending on the orientation of the engine. This causes a vibrational response of the vanes at the first engine orders 1N, 2N and 3N (possibly more). On the other hand, in the absence of an air inlet duct, the direction of the air which flows through the vanes is not parallel to the engine axis. This slip angle causes forces, called "1P," which cause a vibrational response of the vanes at engine order 1N. Similarly, 1P forces can also appear during climbing or approach phases of the airplane because the air flows through the vanes at an angle of incidence. These vibrational excitations at high speed generate a very high stress cycling on the entire blading. In particular, the vane root portion, located between the hub and the channel, also called the "stilt," is a loaded and critical zone due to its function of retaining the vane. FR 3 112 819 is known, which discloses a variable-pitch vane root having a retaining bulb and which is reinforced by applied metal shells allowing limiting the premature wear of the vane. This solution was proposed in order to respond to the disadvantages encountered with a broached attachment. Nevertheless, the mechanical durability of such a blade can still be improved.

The present invention proposes to reinforce a variable-pitch vane made of composite material for an unducted fan of an aircraft, particularly in order to improve its resistance to "1P" forces.

DISCLOSURE OF THE INVENTION

The present invention relates to a variable-pitch vane made of composite material for an unducted fan of an aircraft, comprising:

a fibrous reinforcement, formed as a single piece of three-dimensional fabric, comprising an airfoil portion and a root portion forming a retaining bulb and intended to be connected to a variable pitch mechanism, the three-dimensional weaving being accomplished continuously between the root portion and the airfoil portion, the fibrous reinforcement defining an internal shaping cavity, formed by a non-interlinking, extending inside the root portion and the airfoil portion, a matrix densifying said fibrous reinforcement, and metal reinforcing shells applied around the root portion.

The invention implements a single-texture reinforcement, obtained by three-dimensional weaving between the root and the airfoil, with a reinforcement of the exterior portion of the composite root by metal shells. The continuity of the three-dimensional weaving between the root and the airfoil facilitates the transmission of forces without creating a mechanically weak interface. In addition, this continuity of weaving allows providing directly the retention of the blade on the root, without having to create a mating interface as in the case where an extension of the root is introduced and attached to the inside of the vane as proposed by FR 3 112 819.

In one exemplary embodiment, the airfoil portion defines two second internal shaping cavities, formed by a second non-interlinking, leading to the root portion and located on either side of the shaping cavity, the metal shells being partly accommodated in the second shaping cavities.

The extension of the shells in the second cavities avoids the transmission of aerodynamic forces from the airfoil to the shells by means of the composite material, which would subject the border between the metal shells and the composite material to large shearing forces which can, in certain cases, lead to debonding. The metal shells directly provide the transmission of the aerodynamic forces to the retention zone by means of bending forces. In addition, the shells are inserted here into the second shaping cavities in a simple manner during manufacture, through the bottom of the airfoil portion, i.e. by its lower end along a longitudinal direction of the vane.

In particular, a greater transverse dimension defined between the metal shells, measured in the chord direction, can be substantially constant in the second shaping cavities.

Such a characteristic is allowed, because the retention of the blade in the channel is not provided by cross section shrinking but by fiber continuity. It allows simplifying the shape of the shells and facilitating their insertion into the cavity during manufacture.

In particular, a shaping element made of cellular or porous material, distinct from the metal shells, can be present in each of the second shaping cavities.

The use of this or these shaping elements having a low density participates advantageously in lightening the vane. In addition, as for the shells, a simple insertion is allowed through the bottom of the airfoil during manufacture, thus avoiding having to make an opening by separation at one edge to be able to introduce these elements.

In one exemplary embodiment, the airfoil portion can comprise, in a segment of its longitudinal dimension adjacent to the root portion, a main woven portion defining a leading edge and a trailing edge, said main portion being separated at the second non-interlinking into skin woven portions each delimiting a second shaping cavity, and an intermediate woven portion located between the skin portions, said intermediate portion being separated at the non-interlinking into two separated portions delimiting the shaping cavity.

In one exemplary embodiment, the vane also comprises a shaping part present in the internal shaping cavity, said shaping part being hollow at least at a lower longitudinal end of the vane.

Such a characteristic advantageously allows placing in the hollow portion of the shaping part one or more masses which participate in improving the balancing of the rotor.

In one exemplary embodiment, the root portion comprises a mounting portion, defining the retaining bulb, and a stilt portion which provides the transition between the mounting portion and the airfoil portion, the metal shells extending around the mounting and stilt portions.

In one exemplary embodiment, the fibrous reinforcement is formed from carbon fibers, from glass fibers, from aramid fibers, or from a mixture of such fibers. The fibrous reinforcement is advantageously formed from carbon fibers.

In one embodiment, the matrix is an epoxy resin.

A person skilled in the art will recognize that other resins can be considered and that the resin employed can be thermosetting or thermoplastic.

The present invention also relates to an unducted fan intended to be mounted on an aircraft, comprising a hub comprising vane attachment portions, and a plurality of vanes as described above mounted on the attachment portions.

BRIEF DESCRIPTION OF THE DRAWINGS

FIG. 1 shows schematically a section taken perpendicular to a chord direction of an example of a vane according to the invention connected to a variable pitch mechanism, FIG. 2 shows schematically the vane of FIG. 1 in section in a plane containing the chord and longitudinal directions, FIG. 3 shows schematically the vane of FIGS. 1 and 2 in the section plane III-III, perpendicular to the longitudinal direction and located at a first height in the airfoil portion, FIG. 4 illustrates an example of a possible fibrous arrangement in the section plane III-III in the form of a shaped blank.

FIG. 5 shows schematically the vane of FIGS. 1 and 2 in the section plane V-V, perpendicular to the longitudinal direction, and located at a second height in the airfoil portion, greater than the first height.

FIG. 6 shows schematically an example of an engine including an unducted fan comprising several vanes according to the invention.

DESCRIPTION OF THE EMBODIMENTS

The invention is now described by means of figures, present for the purpose of description to illustrate certain embodiments of the invention, and which must not be interpreted as limiting the latter.

Shown in FIGS. 1 and 2 are sections in two perpendicular planes of an example of a vane 100 according to the invention. The vane 100 comprises a fibrous reinforcement formed in a single piece of three-dimensional fabric which comprises an airfoil portion 102, and a root portion 104 forming a retaining bulb. The fibrous reinforcement can be formed from carbon fibers, from glass fibers, from aramid fibers, or from a mixture of such fibers. The vane 100 extends in a longitudinal direction DL which corresponds to its span or height direction. When the vane is mounted on the unducted fan, the root portion 104 is connected to a variable pitch mechanism 20, the principle of which is known per se, which allow modifying the pitch angle of the blade 100 around a pitch axis Y, in order to adjust the performance of the engine to different flight phases. Here the pitch axis Y extends along the direction DL. The portion 104 corresponds to the portion located below the limit 103 of the aerodynamic channel in the direction DL, and the portion 102 corresponds to the portion located above this limit 103 in the direction DL. The limit 103 separates the portion 102 from the portion 104. The portion 104 can form a lug 104c at the lower longitudinal end intended to control the pitch of the blade in the event of excessive torque occurring for example during a bird ingestion. Any other device allowing creating a secondary force passage can be an alternative.

The engine 200 shown in FIG. 6 is an engine of the unducted type (called "open rotor"). The engine comprises a nacelle intended to be fixed to a fuselage of an aircraft, and an unducted fan 204. The invention is also applicable to architectures of the turboprop type. In FIG. 6, the fan rotor comprises a hub mounted in rotation relative to the nacelle and the vanes 100 are attached to the hub and are mounted inside the variable pitch mechanism 20 provided in the hub. The portion 104 is mounted in rotation inside the mechanism 20 provided in the hub, by means of balls 22 or other rolling elements.

The portion 104 comprises a mounting portion 107a, defining the retaining bulb, which is accommodated in the mechanism 20, and a stilt portion 107b, which provides the transition between the portion 107a and the airfoil portion 102.

The retaining bulb defines an upper frusto-conical portion 104a in the direction DL, called the upper reach, which has a cross section, taken transversely to the direction DL, which decreases when moving toward the portion 102 so as to cooperate with a support surface 24 of the mechanism 20 to ensure the retention of the vane 100 subjected to centrifugal force, as well as the resumption of bending forces. The retaining bulb also defines a lower frusto-conical portion 104b in the direction DL, called the lower reach, which has a cross section, taken transversely to the direction DL, which decreases when moving away from the portion 102. This portion 104b rests on the support surface 26, which corresponds here to a barrel which is movable in the direction DL relative to the internal bearing ring supported on the bearings, and allows applying a pre-load during the assembly of the vane root into the mechanism 20, i.e. the root is pressed between the upper reach and the lower reach. A blocking member can be introduced through openings 27 and 29 so as to maintain the retaining bulb in compression between the support surfaces 24 and 26.

An organic matrix made of thermosetting or thermoplastic resin, for example of epoxy resin, densifies the fibrous reinforcement by filling its porosity and by encapsulating the fibers of this reinforcement. In addition, the portion 104 is reinforced by applied metal shells 105, which extend over substantially its entire height, measured along the direction DL, and extend, in the example considered, into the portion 102, as will be detailed below. The shells 105 extend in particular around the portions 107a and 107b. The shells 105 are impressions of the portion 104 and have a complementary shape. In particular, the shells 105 assume the shape of the retaining bulb and of the portion 107b. In particular, the shells 105 surround the internal shaping cavity 111, which will be described hereafter. The portion 104 is located between the cavity 111 and the shells 105, and in the example illustrated a fraction of the portion 102 is located between the cavity 111 and the shells 105. The shells 105 can be made of titanium, of titanium alloy such as TA6V, of steel, of aluminum or of aluminum alloy. The shells 105 can be produced by forging, coupled if necessary to mechanical or chemical machining. They are then applied around the portion 104, preferably with a glue film at the interface to improve adhesion of the assembly after formation of the matrix. If a glue film is used, it is deposited on the inner surface of the shells 105 which can previously have been treated by chemical or dry means (for example by laser). The polymerization of the glue film (if present) is accomplished during the formation of the organic matrix, and in particular during the polymerization of the resin allowing this matrix to be obtained.

The fibrous reinforcement is produced by three-dimensional weaving of first yarns, extending generally along the direction DL, with second yarns, extending generally along the chord direction DC. What is meant by "three-dimensional weaving" or "3D weaving" is a fabric in which at least certain of the first yarns link second yarns over several layers of second yarns. Three-dimensional weaving can have an "interlock" pattern, this case being only one example among others as a person skilled in the art will acknowledge. The first yarns can be warp yarns and the second yarns weft yarns or conversely, the roles of warp and weft being able to be reversed in the present text. Three-dimensional weaving is accomplished continuously between the portions 104 and 102, thus first yarns woven with second yarns in the portion 104 extend into the portion 102 and are woven there with second yarns. The first yarns ensure textile continuity between the portions 102 and 104, these two portions being formed contiguously by the same piece of fabric.

The fibrous reinforcement is obtained by forming a fibrous blank which has been woven contiguously between the portions 102 and 104 and by providing non-interlinkings, the structure and function of which will now be detailed in connection with FIGS. 3 to 5. The formation of such a blank calls for weaving techniques that are known per se.

FIG. 3 shows the vane 100 according to the section plane III-III, taken at a first height on the portion 102. A similar structure is confirmed on the segment assembly T of the portion 102, which is adjacent to the portion 104. In this view, the second yarns extend between a leading edge 106 located upstream and a trailing edge 108 located downstream. Unless otherwise stated, the terms "upstream" and "downstream" are taken with reference to the flow direction of the air around the vane 100.

A first non-interlinking D1 is created in the chord direction DC. The non-interlinking D1 is created in the portion 102 as well as in the portion 104. In a manner known per se, a non-interlinking is created between two layers of warp yarns by not allowing weft yarns to pass through the non-interlinking zone so as not to link yarns of warp layers located on either side of the non-interlinking. The non-interlinking D1 defines a non-interlinked (or non-woven) zone extending in the chord direction DC and in the longitudinal direction DL. The non-interlinking D1 defines a first internal shaping cavity 111 in which a shaping part 112 is accommodated, which allows, among other things, forming the root as well as a portion of the airfoil. The presence of this part 112 allows in particular simplifying obtaining the shape of the retaining bulb, thus avoiding having to resort to complex weaving to obtain this shape. In the example considered, the part 112 is an integral part of the vane 100 mounted on the fan, but the scope of the invention is not departed from if this part were withdrawn or eliminated after formation of the matrix and before mounting on the engine. The part 112 can be solid or hollow. It can be made of metallic material, of composite material, for example with an organic matrix with a reinforcement based on short or long fibers, or of cellular or porous material, such as a foam. As illustrated in FIGS. 1 and 2, the part 112 can have a hollow portion 119 at least at a lower longitudinal end of the vane 100, which can contain masses for improving the balance of the rotor. The portion 119 can have an axisymmetrical shape around the direction DL.

The non-interlinking D1 is formed by omitting weaving second yarns with first yarns so as to separate the woven fibrous portion 120 into two non-interlinked woven fibrous portions 122 and 124, which can be moved away from one another at the non-interlinking D1 so as to define the cavity 111 and to be able to accommodate the part 112 in it. The portions 122 and 124 ensure the continuity of first yarns between the portions 102 and 104. The non-interlinking D1 extends from an upstream end D11, located on the side of the leading edge 106, to a downstream end D12, located on the side of the trailing edge 108. The portion 120 separates into two portions 122 and 124 starting at the end D11 and these portions 122 and 124 are woven together starting from the end D12 to re-form the portion 120. Portions 122 and 124 are shown having substantially the same dimension in a thickness direction DE, transverse to the chord direction DC, but of course the scope of the invention is not departed from when this is not the case. It will be noted that the end D11 is spaced from the leading edge 106 and that the end D12 is spaced from the trailing edge 108. No non-interlinking is created at the leading 106 or trailing 108 edges.

In the example illustrated, a second non-interlinking D2 is created in the chord direction DC. The non-interlinking D2 is formed between an upstream end D21 and a downstream end D22. The non-interlinking D2 defines a non-interlinked (or non-woven) zone extending in the chord direction DC and in the longitudinal direction DL. A main woven fibrous portion 130 defines the leading edge 106 and is separated, starting at the end D21, into three woven portions: the portions 132 and 134, called skin portions, which define the aerodynamic profile of the vane and form the suction side and the pressure side, as well as the portion 120 which was described previously, called the intermediate portion, which is located between the skin portions 132 and 134. More precisely, the non-interlinking D2 allows defining two second internal shaping cavities 136 and 138, which are located on either side of the cavity 111 and partially surround it. More precisely, the cavity 136 is delimited, on one side, by the joining of the portions 120 and 122, and by the portion 132 on an opposite side. The cavity 136 is located between the portion 132 and the portion 122, or between the portion 132 and the cavity 111. The cavity 136 is located on the suction side and is present between the suction side and the portion 122, or between the suction side and the cavity 111. The cavity 138, for its part, is delimited on one side by the joining of the portions 120 and 124 and by the portion 134 on an opposite side. The cavity 138 is located between the portion 134 and the portion 124, or between the portion 134 and the cavity 111. The cavity 138 is located on the pressure side and is present between the pressure side and the portion 124, or between the pressure side and the cavity 111. It will be noted that each of the portions 132 and 134 has one dimension, taken along the direction DE, which is decreasing when moving away from the end D21 over at least a fraction of their dimension in the direction DC. The cavities 136 and 138 are located inside the airfoil portion 102 and lead to the root portion 104, i.e. to the limit 103 of the aerodynamic channel.

The elements 140 and 142 participate in conferring the desired shape to the aerodynamic profile of the vane 100. The elements 140 and 142 are made of cellular material, like a honeycomb, or porous like a foam. A layer of organic matrix can be present on the lower longitudinal end of the portion 102 (along the channel limit 103) so as to isolate the elements 140, 142 from the outside in the vane ready to be mounted on the fan.

In addition, the shells 105 extend inside the cavities 136 and 138 and are partly accommodated in them. The cavities 136 and 138 lead at least to the portion 104 to allow the introduction of the shells 105. A first shell 105 is accommodated between the portions 132 and 122 and another between the portions 124 and 134. The shells 105 are located around the portions 122 and 124. A transverse dimension D105 defined between the shells 105, measured in the chord direction DC, can be substantially constant in the second cavities 136 and 138. Preferably, a surface preparation by chemical means or by dry means such as a laser treatment is also applied to this upper portion of the shells which will be placed inside the airfoil, on the one hand, on the outside surface in contact with the portions 122 and 134, and on the other hand on the inner surface in contact with the portions 122 and 124. A glue film is then applied to these surfaces as described above. As illustrated, the elements 140 and 142 are supported on the shells 105 and have a support surface 140a and 142a conforming to their shape. Such an extension of the shells into the airfoil portion 102 constitutes a preferred embodiment and, in a variant not shown, the shells cover only the root portion without extending into the airfoil portion.

The non-interlinking D2 has a downstream end D22 starting at which the portions 120, 132 and 134 are woven together to re-form the main portion 130 defining the trailing edge 108. The end D21 is spaced from the leading edge 1105 and the end D22 is spaced from the trailing edge 108. In the example considered, the non-interlinking D1 is present inside the non-interlinking D2 with the ends D21, D11, D12 and D22 following one another in this order when moving from the leading edge 106 to the trailing edge 108. An upstream zone of the portion 120 connects the end D21 to the end D11 and a downstream zone of the portion 120 connects the end D12 to the end D22.

Shown in FIG. 4 is a view of the second yarns T1-T4 which are warp yarns here, in section transverse to the direction DL. This view corresponds to a view at the state of a shaped blank, shown in particular the excess lengths of non-woven yarns which are intended to be cut to obtain the fibrous reinforcement. The second yarns are divided into four groups each denoted from T1 to T4. The first group T1 is woven with first yarns from the leading edge 106 to the trailing edge 108 and extends in particular into the portions 130, 132 and 134. The second group T2 is also woven with first yarns from the leading edge 106 to the trailing edge 108 while extending into the portions 130, 120, 122 and 124. The yarns of the second group T2 cross each other at the crossing points CT2 which delimit the non-interlinking D1 from the upstream side and from the downstream side. This crossing allows avoiding opening the preform in the direction DE once it is consolidated. This contributes to avoiding that the separated zones extend under mechanical loading. The yarns of the third group T3 cross one another at the crossing points CT3, delimiting the non-interlinking D2 on the upstream side, to divide themselves for example into a first subgroup which is woven with the first yarns in the portions 120, 122, 124 and 130 and extends to the trailing edge 108, and into a second subgroup which leaves the fabric to adjust the thickness of the woven portions. According to one variant, the yarns of the second subgroup are woven in the portions 132 and 134 rather than being removed. The selection of one or the other of these variants will take place depending on the desired thickness for the portions 132 and 134. Generally, the crossing of the yarns at the points CT3 allows having the benefit of the mechanical advantage described above. In the example considered, the yarns of the first subgroup of the third group T3 are separated from the yarns of the first group T1 so as to form the cavities 136 and 138. Finally, the fourth group T4 is woven with the first yarns on the portion 130 and is then removed from the fabric to manage the thickness transitions. The fourth group T4 is woven only on the side of the leading edge and is not reintroduced into the reinforcement after the departure of the yarns, forming excess lengths which are cut during the forming of the blank to obtain the fibrous reinforcement. In the example illustrated, each of the portions 130, 120, 122, 124, 132 and 134 is formed by three-dimensional weaving.

FIG. 5 shows a view along the section plane V-V where the main portion 130, which corresponds to the extension of the textile illustrated in FIGS. 3 and 4 in the direction DL, has the non-interlinking D1 to form the cavity 111. Nevertheless, there is no more non-interlinking D2 at this height.

What follows is devoted to describing details relating to the method of manufacturing the vane 100. First of all, a fibrous blank, made of a single piece of fabric, is obtained by three-dimensional weaving while providing non-interlinkings D1 and D2, while using techniques known per se. Then the part 112 is introduced inside the non-interlinking D1. The shells 105 are applied to the portion 104 and introduced, in the example illustrated, into the non-interlinking D2 as previously described. Also introduced are the shaping elements 140 and 132 into the non-interlinking D2, which were previously shaped to the desired geometry. In this manner, the blank is made to the shape of the vane 100 to be obtained. Cutting the excess lengths is performed, and the assembly is then placed into an injection mold in order to proceed with the introduction of a resin into the porosity of the reinforcement, for example by a technique of resin transfer molding. It is then possible to carry out a treatment for thermally polymerizing the resin thus introduced and to place, in a manner known per se, the metal protection 110 and a possible deicing system in order to obtain the vane 100 ready to be mounted on the engine.

The invention claimed is:

1. A variable-pitch blade made of composite material for an unducted fan of an aircraft, comprising:
   a fibrous reinforcement, formed as a single piece of three-dimensional fabric obtained by three-dimensional weaving, comprising an airfoil portion, and a root portion forming a retaining bulb and intended to be connected to a variable pitch mechanism, the three-dimensional weaving being accomplished continuously between the root portion and the airfoil portion, the fibrous reinforcement defining an internal shaping cavity, formed by a non-interlinking extending inside the root portion and the airfoil portion,
   a matrix densifying said fibrous reinforcement, and
   metal reinforcing shells applied around the root portion.

2. The variable-pitch blade according to claim 1, wherein the airfoil portion defines two second internal shaping cavities, formed by a second non-interlinking leading to the root portion and located on either side of the shaping cavity, the metal reinforcing shells being partly accommodated in the second shaping cavities.

3. The variable-pitch blade according to claim 2, wherein a larger transverse dimension, defined between the metal reinforcing shells, measured in a chord direction, is substantially constant in the second shaping cavities.

4. The variable-pitch blade according to claim 2, wherein a shaping element made of cellular or porous material, distinct from the metal reinforcing shells, is present in each of the second shaping cavities.

5. The variable-pitch blade according to claim 2, wherein the airfoil portion comprises, in a segment of its longitudinal dimension adjacent to the root portion, a main woven portion defining a leading edge and a trailing edge, said main woven portion being separated at the second non-interlinking into skin woven portions each delimiting a respective second shaping cavity, and an intermediate woven portion located between the skin woven portions, said intermediate portion being separated at the non-interlinking into two separated portions delimiting the shaping cavity.

6. The variable-pitch blade according to claim 1, wherein the blade also comprises a shaping part present in the internal shaping cavity, said shaping part being hollow at least at a lower longitudinal end of the blade.

7. The variable-pitch blade according to claim 1, wherein the root portion comprises a mounting portion defining the retaining bulb, and a stilt portion which provides a transition between the mounting portion and the airfoil portion, the metal reinforcing shells extending around the mounting and stilt portions.

8. The variable-pitch blade according to claim 1, wherein the fibrous reinforcement is formed from carbon fibers, from glass fibers, from aramid fibers, or from a mixture of such fibers.

9. The variable-pitch blade according to claim 1, wherein the matrix is an epoxy resin.

10. An unducted fan intended to be mounted on an aircraft, comprising a hub comprising blade attachment portions, and a plurality of variable-pitch blades, each variable-pitch blade being according to claim 1, mounted on the blade attachment portions.

\*    \*    \*    \*    \*